United States Patent Office 3,575,881
Patented Apr. 20, 1971

3,575,881
METHOD OF GELLING IONIC LIQUIDS AND GELLED COMPOSITION
Bobby L. Atkins, Robert N. Bashaw, John B. Gardner, and Billy G. Harper, Lake Jackson, Tex., assignors to The Dow Chemical Company, Midland, Mich.
No Drawing. Continuation-in-part of application Ser. No. 418,885, Dec. 16, 1964. This application Dec. 26, 1967, Ser. No. 693,070
Int. Cl. B01j *13/00;* C05c *1/00;* C11d *7/08*
U.S. Cl. 252—316        12 Claims

ABSTRACT OF THE DISCLOSURE

A method of gelling dilute or concentrated inorganic acids, having an oxidizing potential of less than that of concentrated nitric acid, and aqueous solutions of acids, bases, or salts comprising adding thereto a minor amount of a polymerized organic N-vinyl-substituted heterocyclic nitrogen compound. The polymers used are cross-linked, water-insoluble and water-swellable, and they are dried and pulverized before being admixed with the ionic liquid to be gelled. The gelled compositions are useful in preparing improved salt-containing fertilizers and in cleaning surfaces.

---

This application is a continuation-in-part of Ser. No. 418,885 filed Dec. 16, 1964 now abandoned.

The invention is related to a method of gelling liquids and to a novel gelled composition. More particularly the invention relates to a method of gelling acids, having a lower oxidation potential than that of concentrated nitric acid, and acid, base, or salt solutions by employing a cross-linked, insoluble, swellable polymer heretofore unknown for this purpose and the resulting gelled composition.

Agents for admixture with water and non-ionic aqueous solutions generally, either to thicken or gel the liquid or to swell the agent, are known. Illustrative of known agents for gelling water, for example, are polyacrylic acid and its alkali salts, polymethylcellulose, polyammonium acrylate, relatively high concentrations of polyacrylamide, and certain naturally occurring gums. The cross-linked polymers which are analogs of the aforementioned linear polymers are known to be insoluble in water and perform somewhat better than the linear polymer for gelling water and non-ionic aqueous solutions.

However, polymers heretofore employed as gelling agents neither effect any significant gel of an inorganic acid or of an aqueous solution of an inorganic acid, base, or salt in which there is an appreciable concentration of an ionic solute, nor in turn are swelled appreciably thereby. For example, cross-linked polyammonium acrylate, which gels as much as 370 grams of water per gram of polymer gels only about 15 grams of a 10 percent by weight aqueous sodium chloride solution. As a further example, cross-linked polypotassium acrylate, which gels as much as 200 grams of water, will gel only 20 grams of an 0.1 N HCl solution. Most known gelling agents not only will gel inadequately such acidic solution, but will be attacked and degraded thereby.

The invention provides a method of gelling substantial amounts of acids, having an oxidation potential of less than that of concentrated nitric acid, and aqueous solutions of acids, bases, or salts. Concentrated nitric acid, as used herein, is such acid having a specific gravity of 1.4 or greater which, in general, is a concentration of greater than 65% by weight $HNO_3$ in water. It provides a particulate gelled aqueous composition which contains large amounts of inorganic salts and is useful as a fertilizer and which can be easily handled and applied to soil. The invention also provides a gelled aqueous acid cleaning composition such as a gelled inhibited acid formulation, which effectively and safely cleans vertical walls, particularly such walls constructed of concrete or metal.

Accordingly, the invention encompasses a method of gelling dilute or concentrated inorganic acids (having an oxidizing potential of less than that of concentrated nitric acid) and aqueous solutions of acids, bases, or salts which comprises adding thereto a minor amount of a polymerized organic N-vinyl-substituted heterocyclic nitrogen compound. The invention further encompasses a method of preparing improved salt-containing fertilizers and a method of cleaning surfaces employing gelled acidic compositions. The aqueous acidic and salt solutions with which the polymer can be admixed in the practice of the invention are those of at least 0.02 normality. The practice of the invention encompasses the gelation of fully saturated aqueous solutions of acids, bases, or salts but does not extend to the gelation of concentrated nitric acid or to fuming acids, e.g. fuming $HNO_3$. The more concentrated the acidic liquid being gelled according to the invention, the more effective it is except as to those acids which have the high oxidation potential aforementioned. Accordingly, solutions of acidic salts (having a pH of less than 7) are readily gelled. Although water may be gelled by polymers employed in the invention, there is no advantage afforded thereby since other gelling agents for such purpose are known and available. Contrary to expectations based upon the behavior of the polymers known to be useful for gelation of certain non-ionic liquids, e.g. water, the polymers employed in the invention swell more readily in, and will gel a larger quantity of, an ionic aqueous solution, e.g. of an acid or salt, than they do of a non-ionc liquid, e.g. water.

The invention provides an improved form of a nitrogen-containing liquid for use in metal treating, for making explosives or for use in agricultural liquid fertilizer which, as a result of such modifications, is easily handled and is prevented from undergoing premature loss of volatizable materials contained therein. Such liquids include mixtures of ammonium nitrate and liquid ammonia in water. They are well known e.g. as described in U.S. Pat. 2,077,469, particularly from line 39 of column 1 to line 3 of column 2 of page 1. Liquid compositions of this nature are commonly referred to as Diver's liquids or Diver's solutions (e.g. as described in The Van Nostrand Chemist's Dictionary, D. Van Nostrand Co., Inc., New York (1953) on page 230) which can be gelled according to the invention and as a result be easily applied to the soil. These aqueous compositions contain a considerable quantity of inorganic salts which are beneficial to the growth of plants. Illustrative of a Diver's liquid useful as a fertilizer is one which consists essentially of about 60 to 80 percent $NH_4NO_3$, about 5 to 30 percent water, and about 15 to 30 percent ammonia, to make 100 percent by weight.

The method of the invention also provides formulations for use in industrial cleaning operations and the compositions so made. Such composition has particularly wide utility for use in cleaning vertical metal walls and containers since the gelled composition of the invention adheres to the wall and drains away relatively slowly, thus allowing a suitable length of contact of the composition with the surface to be cleaned and resulting in a more effective cleaning operation accompanied by a saving in the amount of acid used.

Among the known acid metal-cleaning formulations is a mixture of nitrosylsulfuric acid, sulfuric acid, and water. Surprisingly, this metal cleaning formulation is readily gelled by a polymerized N-vinyl-substituted heterocyclic nitrogen compound in accordance with the invention. Most known thickeners or gelling agents are not operable in highly acidic cleaning compositions of the nature of those comprising nitrosylsulfuric acid and sulfuric acid.

Polymers useful for gelling acids and ionic aqueous solutions to attain the objective of the invention are cross-linked, water-insoluble polymers prepared from the N-vinyl-substituted organic heterocyclic nitrogen monomers having the structure:

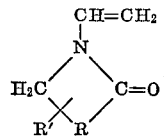

wherein R is —CH$_2$O—, —CH$_2$OCH$_2$—, —(CH$_2$)$_2$— or —(CH$_2$)$_3$— and wherein R' is an alkyl group having 1 or 2 carbon atoms.

Only those polymers can be used in the practice of the invention which are suitably cross-linked. The acceptable extent of cross-linking is measured by a gel test, subsequently described. In accordance with the test, the acceptable polymer must be insoluble (but dispersible) in water and aqueous acid solutions but capable of imbibing at least about 17 grams of a 20 percent by weight aqueous solution of HCl in 48 hours per gram of polymer.

Illustrative of the monomers, from which the polymers useful in the present invention are derived, are N-vinylmorpholinone, N-vinyl-2-oxazolidinone, N-vinyl pyrrolidone, N-vinylpiperidone and alkyl nuclear-substituted derivatives of said monomers, such as N-vinyl-5-methyl-2-oxazolidinone, N-vinyl-4-ethyl oxazolidinone, N-vinyl-3-methyl morpholinone, N-vinyl-3-ethyl pyrrolidone, and N-vinyl-5-methyl piperidone.

The cross-linked polymers useful in the practice of the invention are a recent discovery. They may be prepared either by use of a cross-linking agent and a chemical catalyst or by irradiation, or by a combination of both. In any case, a monomer having the generic formula given above, or a previously prepared linear polymer thereof, is cross-linked either in mass, i.e. without use of a liquid reaction medium, or in an aqueous or lower aliphatic mono-alcohol solution. It is preferable that the polymerization be carried out in an aqueous solution of at least about 5 percent concentration. Best results are obtained when a monomer or linear polymer in water at a concentration of between 20 and 90 percent (and usually between 25 and 50 percent), by weight of the reaction mixture, is employed. A chemical cross-linking agent is necessary when employing a chemical catalyst and is recommended when employing irradiation. The cross-linking agent is employed in an amount of between 0.02 and 10.0 percent (preferably between 0.2 and 5.0 percent), based on the weight of the monomer or linear polymer reactant.

References which discuss polymerization techniques applicable hereto include U.S. Pats. 2,810,716, Jr. of Polym. Science, vol. 23, page 355, (1957), and Jr. of Physical Chemistry, vol. 63, page 1852, (1959). Cross-linking agents of the polyvinylidene type may be used of which divinyl ether, divinyl benzene, N,N'-methylenebisacrylamide, and divinyl ether of diethylene glycol are illustrative. Choice of cross-linking agent depends in part on the liquid to be subsequently gelled and the application in which the so-gelled composition is to be used.

The chemical catalyst, when employed, may be any of those known as free-radical catalysts of which water-soluble persulfates, peroxides, certain azo-type compounds (e.g. α,α'-azoisobutyronitrile), and the redox-type catalysts are illustrative.

When the cross-linked polymer is prepared by an irradiation technique, a total dosage of between 0.3 and 15.0 megarads is usually used and preferably between 0.5 and 3.0 megarads. The extent of irradiation is that which produces a cross-linked polymer, insoluble but swellable in aqueous liquids. Care must be exercised, however, to control the extent of cross-linking so as to provide a polymer which is sufficiently cross-linked to be insoluble in the aqueous ionic solutions, but not so highly cross-linked to prevent its dispersing in, swelling, and imbibing large volumes of aqueous solutions.

Typical of a polymer useful in the invention is that prepared by polymerizing an aqueous solution of linear polyvinylmorpholinone, e.g. 85 percent by weight in water, by irradiation to a total dosage of 0.75 megarad, at a dosage rate of about 0.3 megarad per hour at ambient temperature.

As a further illustration of a procedure for obtaining a polymer useful in the practice of the invention the following example is given: A mixture of 450 grams of N-vinylpyrrolidone, 0.9 gram of α,α'-azobisisobutyronitrile (as a catalyst), 0.45 milliliter of 1-amino-2-propanol, 2.25 grams of divinyl ether of diethylene glycol, and 1800 milliliters of water are placed in a suitable container and heated for about 8 hours under a protective blanket of nitrogen at from about 70° to 80° C. The polymer gel so formed is dried, e.g. by being placed in an oven at between 80° and 120° C., and then ground to a suitable size powder, one gram of which, when admixed with 0.1 N hydrochloric acid, gels 60 grams of the 0.1 N hydrochloric acid.

Illustrative of another procedure for obtaining a polymer useful in the practice of the invention is a combination of the above two procedures which comprises irradiating (to provide an initiating source of free radicals) a polymerizable monomer together with a cross-linking agent. As illustrative, a sample of N-vinyl-5-methyl-2-oxazolidinone containing 0.05 percent by weight of N,N'-methylenebisacrylamide as cross-linking agent is exposed to a total dose of 2.4 megarads of gamma radiation emitted by a Cobalt-60 source. The polymer thereby formed, when admixed with hydrochloric acid gels the acid to substantially the same extent as does the N-vinylpyrrolidone polymer prepared as described in the preceding paragraph.

The linear polymers, from which are derived the cross-linked polymer analogues useful in the practice of the present invention, are known to have molecular weights in the range of 20,000 to 400,000.

The molecular weight of insoluble polymers cannot be ascertained accurately by known methods. It is estimated that the molecular weight of the polymers necessary to employ in the practice of the invention is at least about 800,000 and may be as high as 20,000,000. However, the molecular weight, if known, is not a reliable measure of cross-linkage and therefore of functionality in the practice of the invention.

The cross-linked polymers necessary to employ in the invention are herein described in terms of the methods by which they are prepared and, as aforesaid, in terms of their gel capacity. There is no method known by which molecular weight is accurately related either to the amount of cross-linkers added or to the gel capacity. Therefore the molecular weight, even though known, would not be a reliable test. The gel capacity is a function of the three dimensional network of the cross-linked polymer. The more cross-links there are among any given group of polymer chains (beyond that necessary to render the polymer insoluble) the tighter the network and the less the gel capacity. It is entirely possible for two polymers having different amounts of cross-linking and consequently different gel capacities to have the same average molecular weight.

The polymers useful as gelling agents in this invention can be employed in amounts of from about 0.05 to about 25 percent, but usually not in excess of about 10 percent, by weight of the ionic solution with which they are admixed. The amount of polymer employed within this range will depend upon (1) the particular polymer used, (2) the solution which is desired to be gelled, (3) the amount of cross-linking agent present during the preparation, and (4) the particular use to which the gelled solution is to be put. For example, the amount of crosslinking agent employed is determined by the type and nature of catalyst ued or the amount of radiation dosage. The polymer employed is cross-linked to the extent that it is water-swellable and water-dispersible but not water-soluble. The use of too little cross-linking agent or radiation can result in a soluble polymer and too much cross-linking agent or radiation can result in a polymer which is so highly cross-linked that it swells only slightly. As illustrated in Example 5, set forth hereinafter, N-vinylmorpholinone (which had been polymerized and cross-linked irradiation) imbibed 34 grams of concentrated hydrochloric acid when prepared by use of a dosage of 0.75 megarad but imbibed only 21 grams of the same acid when prepared by use of a dosage of 2.4 megarads. For other polymers useful in the practice of the invention, e.g. poly(N-vinylpyrrolidone), some slight differences in gel capacity will be observed when using the same doses of irradiation to produce the cross-linked polymers.

To illustrate the difference in amounts of polymer used in ionic solutions of the same type but of varying concentration, reference may be made again to Example 5 hereof, wherein a sample of polymer prepared by radiation, using 0.75 megarad of total dosage, imbibed only 43 grams of a 20% HCl aqueous solution, but wherein the same polymer imbibed 54 grams of concentrated hydrochloric acid.

The amount of polymer to use is also partially determined by the intended end use of the gelled product. For example, if the gel is to be sprayed, a different amount of polymer is used than if a liquid is to be gelled to a firm solid for the purpose of easier handling and transporting.

The invention is more fully described by the following examples:

EXAMPLE 1

10.0 grams of N-vinylmorpholinone were dissolved in water to provide complete dissolution and thereafter sufficient water added to make 100 ml. of solution. The solution was then irradiated by a $Co^{60}$ gamma ray source at a dosage rate of 0.32 megarad per hour. The sample was irradiated for a period of four hours, having been exposed to a total dosage of 1.28 megarads. The product thus made was cross-linked poly(N-vinylmorpholinone). It was dried, pulverized, and found to be insoluble in water, aqueous acids, and aqueous salt solutions. The polymer was found to be swelled to a much greater extent by acids and aqueous salt solutions than by water.

EXAMPLE 2

Linear poly(N-vinylmorpholinone), a water-soluble polymer, was mixed with an equal weight of water and irradiated sufficiently to provide a dosage of 2 megarads of electron radiation from a General Electric Resonant-Type Transformer Electron Beam Generator. The resultant product was dried and was found to be a hard, brittle, water-insoluble highly cross-linked polymer, which was swollen by acids and aqueous acid solutions.

EXAMPLE 3

Solid N-vinylmorpholinone, in the dry state, was irradiated by subjecting it to a $Co^{60}$ gamma radiation source for 3 hours at a dosage rate of 0.32 megarad per hour to give a total dosage of 0.96 megarad. The resulting product, designated (a) hereinafter, was a sticky semisolid mass. It was water-soluble, and hence not useful for the process of this invention because it had been insufficiently cross-linked. The example shows that polymerization in the dry state requires a greater total dosage than when it is carried out in aqueous solution. It also shows that care must be exercised to provide sufficient cross-linking to make a polymer which necessarily must be insoluble but swellable in the acid or acidic solution.

The polymer was then irradiated for an additional 0.5 hour at the same rate. The result was a polymer, designated (b), which, when dried, was a glassy brittle solid which was water-insoluble and when admixed with aqueous acids or salt solutions, resulted in a gel.

EXAMPLE 4

Varying degrees of polymerization were employed to prepare four polymers in this example to demonstrate that insufficient polymerization of a dry monomer provides an extent of cross-linking which is insufficient to insure the preparation of a polymer that is adequately cross-linked to imbibe sufficient ionic liquid to be swollen by the liquid with which it is admixed. The polymers are designated (c), (d), (e), and (f), each prepared by increased dosages. Table I below shows the effect of increasing the irradiation dosages in the preparation of the polymer prepared by irradiating solid powdered N-vinylmorpholinone by use of $Co^{60}$, similarly to the procedure of Example 3 above. The values obtained in Example 3 are repeated in Table I for ready comparison.

TABLE I

| Polymer designation | Irradiation period in hours | Total dosage in megarads | Gelation properties |
|---|---|---|---|
| (a) | 3.0 | 0.96 | Water-soluble and unsatisfactory for use in invention. |
| (b) | 3.5 | 1.28 | Satisfactory for use in invention. |
| (c) | 5.0 | 1.60 | Do. |
| (d) | 15.5 | 4.95 | Do. |
| (e) | 27.5 | 8.80 | Acceptable but slowly swellable. |
| (f) | 90.0 | 28.6 | Too highly cross-linked for use in practice of the invention. |

It is to be borne in mind that the polymers tested for gelation properties and reported in Table I were irradiated in the dry state; when polymerized in aqueous solution, the dosages recommended are substantially less than those shown in Table I.

The extent to which the polymer or monomeric mixture is subjected to the action of either the chemical catalyst or irradiation is that which produces an insoluble polymer having the desired swelling characteristics for use in swelling the ionic liquid being employed in the practice of the selected embodiment of the invention.

The polymer formed in Examples 1 and 2 and those designated (b) to (e) of Examples 3 and 4 were cross-linked to an acceptable extent whereas that of test (a) of Example 3 was clearly too little cross-linked and that of test (f) of Example 4 was too greatly cross-linked.

EXAMPLE 5

50% by weight aqueous solutions of N-vinyl-morholinone were independently given dosages of 0.1, 0.3, 0.75, 1.8, and 2.4 megarads emitted by $Co^{60}$ in a gamma cell. The dosage rate was 0.3 megarad per hour. A polymer was formed which was dried and pulverized. 10-gram samples thereof were placed in 500 ml. of each of water, 20% aqueous HCl, and concentrated HCl, respectively. After 48 hours, a gel formed in each instance which was separated and weighed. The results are set out in Table II, below.

TABLE II.—POLYMER PREPARATION

| Dosage in megarads | Grams of gelled liquid imbibed per gram of polymer in each of— | | |
|---|---|---|---|
| | Water | 20% HCl | Conc. HCl |
| 0.1 | None | None | None |
| 0.3 | None | None | None |
| 0.75 | 23 | 43 | 54 |
| 1.8 | 14 | 21 | 28 |
| 2.4 | 12 | 17 | 21 |

Table II shows that insufficient cross-linking produces a polymer which is not satisfactory. It also shows that better gel performance is obtained in acids than in water and also that better gel performance is obtained when the polymer is that obtained at an intermediate cross-linked stage, as illustrated by a dosage of 0.75 megarad. It also shows that better results are obtained by polymerizing in solution.

EXAMPLE 6

Samples of the cross-linked poly(N-vinylmorpholinone) which had been made by irradiating with 0.75 megarad in Example 5 were admixed with aqueous solutions of acids, bases, and salts in accordance with the invention.

Table III shows the gel capacity of the polymer so made in the various solutions.

TABLE III

| Solution | Concentration, percent | Gel capacity [1] |
|---|---|---|
| $HNO_3$ | 60 | 100 |
| $HNO_3$ | 10 | 65 |
| $H_3PO_4$ | 86 | 110 |
| $H_3PO_4$ | 10 | 67 |
| $H_2SO_4$ | 97 | 172 |
| $H_2SO_4$ | 10 | 73 |
| NaCl | 20 | 67 |
| NaCl | 5 | 50 |
| NaOH | 10 | 16 |
| NaOH | 2 | 47 |

[1] G. of liquid/g. of polymer imbibed in 48 hours.

Reference to Table II shows that the polymer employed was effective to gel the various ionic liquids with which it was admixed. The table clearly shows that the more acidic liquids imbibe a greater amount of the liquid.

EXAMPLE 7

Poly N(vinylmorpholinone) was prepared by irradiating 50% by weight solutions thereof in methanol. The dosages employed are those shown in Table IV. The polymer prepared was dried and pulverized. 10 gram samples of the polymers so made were admixed with 500 m.l. of each of water and 20% aqueous HCl solutions and allowed to stand for 48 hours. The results are also shown in Table IV.

TABLE IV.—POLYMER PREPARATION

| Dosage in megarads | Grams of gelled liquid per gram of polymer in each of— | |
|---|---|---|
| | Water | 20% HCl |
| 0.1 | None | None |
| 0.3 | None | None |
| 0.9 | None | None |
| 1.5 | None | None |
| 3.3 | 13 | 25 |

Reference to Table IV shows that less than 1.5 megarads produced no insoluble gel in either water or in the HCl solution. 3.3 megarads was satisfactory. A further polymer was made employing 10 megarads. The resulting polymer when admixed with each of water and 20% HCl in the amount of 10 grams in 500 ml. imbibed too little thereof to provide fully satisfactory gel. The extent of irradiation had produced too highly cross-linked polymer. The results set out in Table IV show that, although a polymer prepared in an alcohol solution is satisfactory for use in the practice of the invention, there is no advantage in employing such procedure; aqueous solutions are to be preferred.

A particular advantage of the invention is for the gelation of Diver's liquids. As aforesaid, these liquids are solutions of ammonium nitrate and ammonia in water and are good solvents for metals. Since they have a very high nitrogen content and only a minor amount of water, they have recently been employed as fertilizers. The imbibing of such liquids by the polymers taught in the present invention prevents the evolution of ammonia in whatever application they may be employed.

EXAMPLE 8

Two samples of Diver's liquid were prepared by admixing 69% ammonium nitrate, 25% ammonia, and 6% water. To one of these samples was admixed 1% by weight and to the second 2% by weight of a radiation cross-linked polymer of N-vinylpyrrolidone, prepared as follows: An aqueous solution, containing 50% by weight of N-vinylpyrrolidone, was irradiated with a dose of 0.805 megarad from a 3500 curie cobalt-60 source of gamma rays at a dosage rate of 0.23 megarad/hour. The polymer so made was separated from the reaction medium, dried in an oven for about 8 hours at a temperature of about 120° C., and then ground to a powder.

A particulate gel with some liquid adhering to the surfaces of the particles was formed when 1% polymer was used. Such gel is useful when higher fluidity is desired. A firm gel which completely imbibed the liquid was formed in the sample employing 2% polymer. Although either of the resulting composition has acceptable consistency for use in fertilizing by the spray technique of application, the latter, e.g. that containing 2% of the selected polymer, was excellent for such purpose.

The two tests were repeated, employing poly(N-vinylmorpholinone) prepared by polymerizing N-vinylmorpholinone in the same manner as the poly(N-vinylpyrrolidone) was prepared. The results obtained, when the resulting poly(N-vinylmorpholinone) was admixed, in amounts of 1% and 2%, respectively, with the two samples of Diver's liquid, were substantially the same as those obtained employing the poly(N-vinylpyrrolidone).

EXAMPLE 9

In order to compare the gelling properties of the polymers of the present invention with those of a widely used conventional gelling agent for gelling acid solutions, the following experiment was performed for comparative purposes:

Comparative Run A

Equal amounts (0.33 gram) of a copolymer consisting of polymerized ethylene glycol, of 9,000 average molecular weight, and tolylene diisocyanate, were added to each of three bottles containing 50 ml. of each of concentrated sulfuric acid, concentrated hydrochloric acid, and water. After one hour, the contents of the bottles were examined, and it was observed that each liquid was gelled. The water and hydrochloric acid were clean while the sulfuric acid was slightly colored. After 24 hours, the bottles were again examined. The gels earlier formed had been completely destroyed in the acids, but not in water. This run, for comparative purposes, shows that, although this conventional polymer was satisfactory for gelling water, it is quite unsatisfactory when used to gel acid solutions.

Comparative Run B

One gram of cross-linked poly(N-vinylmorpholinone) prepared as in Example 1 was placed in each of 100 ml. of the concentrated acids employed in Comparative Run A. Gels formed within one hour. These gels were stored at fluctuating room conditions for over one year on the shelf. They were thereafter examined and found to be stable after such storage period and, except for a slight discoloration of the sulfuric acid gel, to be completely clear after that time.

If, for any reason, it is desirable that the polymer degrade after a period of time one can use a crosslinking agent which itself is degradable by a strong acid. Such degrading will aid in disposing of these gelled solutions. For example diacrylamide cross-linking agents are acid degradable. These will degrade slowly upon hydrolysis of the amide links.

EXAMPLE 10

20 grams of poly(N-vinylpyrrolidone), prepared by irradiating a 50% aqueous solution of the monomer to a dosage of 0.69 megarad at a rate of 0.23 megarad per hour, were admixed with 1000 grams of a 25 percent by volume aqueous solution of HCl containing 0.3 percent by volume of an inhibitor to corrosion. A tight, highly satisfactory gel was formed, suitable for cleaning surfaces and the like as by spraying or dipping.

EXAMPLE 11

A solution of 15 percent by volume aqueous solution of $H_2SO_4$, containing an inhibitor to corrosive attack on metal, was gelled by admixing therewith a first portion of poly(N-vinylpyrrolidone) prepared by irradiation as in Example 8 and a second portion of poly(N-vinylpyrrolidone) prepared by cross-linking with 0.7 percent divinyl benzene in the presence of a redox catalyst. The polymers so made were dried and pulverized. Two percent of the polymer by weight of the sulfuric acid was used. Gelled compositions resulted. The so-gelled compositions and an ungelled portion were used to clean smooth vertical grease-coated tarnished surfaces. The gelled acids adhered to the surface and drained off very slowly, so that prolonged contact with the area to be cleaned was maintained. Excellent cleaning resulted. The ungelled portion ran off quickly, was largely wasted and resulted in a poor cleaning job.

EXAMPLE 12

Similarly to Example 11, two polymers were independently employed, each in an amount of 2 percent by weight, in acid. One polymer so used was prepared by irradiating N-vinylpyrrolidone as in Example 8 and the other polymer by cross-linking N-vinylmorpholinone with 0.7 percent divinyl benzene in the presence of a catalytic amount of azobisisobutyronitrile. The polymers so made were dried, pulverized and admixed with a 30 percent by volume aqueous solution of phosphoric acid. The acid in each instance was imbibed to the extent of at least about 30 grams per gram of polymer. The gelled acidic solutions were then employed to clean vertical surfaces similarly to Example 11.

Results of cleaning with these gelled acids (composed of 98 parts of the 30 percent acid and 2 parts of a cross-linked polymer) were similar to those of Example 11.

EXAMPLE 13

To show the applicability of the invention to a cleaning procedure commonly referred to as bright dipping for metal articles, this example was run. A 12 percent by weight phosphoric acid aqueous solution and a 60 percent by weight phosphoric acid aqueous solution were prepared. Two samples of each of the concentrations were placed in separate containers, thereby providing four samples for testing. To each were admixed 10 percent by weight isopropyl alcohol, 4 percent hydrofluoric acid, and 1 percent of a non-ionic surfactant prepared by condensing nonylphenol with ethylene oxide and sufficient water to make a 100 percent by weight.

A polymer (prepared by subjecting N-vinylpyrrolidone to irradiation as in Example 8), in an amount of 2.0 percent by weight, was admixed with one sample of the 12 percent $H_3PO_4$ aqueous solution and in an amount of 1 percent with one sample of the 60 percent by weight $H_3PO_4$ solution. The so treated samples gelled. For comparative purposes the remaining samples of each of the 12 percent $H_3PO_4$ solution and the 60 percent $H_3PO_4$ solution, containing the additaments set out above, were left without further treatment, i.e. they were not gelled. Aluminum articles having a tarnished surface were dipped into each of the ungelled and the gelled formulations, then removed and suspended over the tank and observed for five minutes. The ungelled composition drained off quickly. The gelled composition adhered to the surface in a uniform film to an appreciable extent throughout the five minute period. It was then washed clean, revealing a bright, shiny metal surface. The articles dipped into the ungelled formulations showed little improvement after one dip and required repeated treatments over a longer period of time to obtain similar results to those obtained by one treatment in the gelled composition.

EXAMPLE 14

Two samples of 18 percent by weight aqueous HCl were prepared. To one of the samples so prepared was admixed 2 percent by weight of poly(N-vinylmorpholinone), and to the other sample 2 percent by weight of poly(N-vinylpyrrolidone). The polymers employed had each been prepared by irradiating a 50 percent aqueous solution to a dosage of 0.69 megarad at a dosage rate of 0.23 megarad per hour and drying and pulverizing the polymer so sade to a particle size of between 48 to 150 mesh (U.S. Bureau of Standards Sieve Series). For comparative purposes, an 18 percent aqueous HCl solution was also prepared to which no polymer was added. Each of the two samples of the invention and the ungelled sample was sprayed on separate areas of the upright side of a badly rusted iron tank, at a pressure of 150 p.s.i.g. (pounds per square inch gauge pressure). Substantially all of the ungelled acid quickly ran off and was soaked into the ground, whereas in contrast thereto, the gelled acids slowly spread down the side of the tank forming a substantially uniformly thick layer. After 30 minutes, the so treated side of the tank was washed with water, removing the adhering gelled cleaning composition. No effect could be observed on the area of the tank which had been treated with the ungelled acid. There was a slight discoloration of the wash water. However, on the areas of the tank treated by the gelled acids in accordance with the invention, continuous, unmottled bright shiny metal shone throughout the treated area. The rust that had been previously present had been removed by the treatment.

EXAMPLE 15

In order to show the superiority of the gelled acids, prepared and used according to the invention, over acids thickened according to known procedures, this example was run wherein, for comparison, cross-linked polyglycols, linear polyacrylic acid, cross-linked polyacrylamide, linear polyethylene oxide, and hydroxy methyl cellulose were each employed in amounts varying from between 1 and 5 percent in each of concentrated sulfuric acid, concentrated hydrochloric acid, and concentrated phosphoric acid.

To observe the contrast in gelling characteristics of the polymers employed in accordance with the invention, the same acids employed above and in the same concentrations were concurrently admixed with 2 percent by weight of poly(N-vinylmorpholinone) and poly(N-vinylpyrrolidone), each prepared in substantially the same manner as that employed in Example 14 above. The samples so prepared, both those prepared for comparison and those of the invention, were examined immediately after preparation. Degradation of all of the polymers employed above for comparison, i.e. those selected from among those known heretofore in the art, showed immediate indications of degradation and within a matter of minutes had completely degraded. In marked contrast thereto the acids gelled in accordance with the invention showed no indications of degradation. The examples of the invention showed no indications of degradation. The examples of the invention were periodically examined over a long period of time and after two years (at which time examination was discontinued) showed no degradation.

EXAMPLE 16

To illustrate the use of gelled acids in a method of cleaning concrete structures, gelled and ungelled cleaning compositions described in Example 14 were prepared and the procedure of Example 14 followed except that stained concrete areas were treated instead of metal areas. The ungelled acid applied to one area was substantially all absorbed into the concrete almost as quickly as it was applied. In contrast thereto, the gelled acids, each containing 2 percent by weight of poly(N-vinylmorpholinone) and poly(N-vinylpyrrolidone) was applied to two areas similarly as in Example 14. They were absorbed only slightly at the interface of the gel and concrete surface. The gelled compositions of the invention flowed relatively slowly down the concrete wall, similarly as in Example 14, forming a thin substantially uniform layer. When the three areas thus treated were washed with water, little improved effect could be noted on the area which had been treated by the ungelled acids whereas the two areas which had been treated with the gelled compositions of the invention were clean and white. In addition to the pronounced improved cleaning effect, the gelled acids employed in the invention covered a much greater area than did that prepared without the polymer. Repeated sprayings of the ungelled acids showed some improved cleaning but was attained at high expense and uneconomical use of time and was accompanied by a waste disposal problem, whereas but one application in accordance with the invention produced a superior result. An accompanying advantage of the use of the practice of the invention for cleaning is a reduced personnel and property hazard over that which is associated with the use of the ungelled acid. The latter forms fine mists and drifts beyond the area of use.

EXAMPLE 17

This example was prepared to show the beneficial effect of employing N-vinyl-5-methyl-2-oxazolidinone to gel various mineral acids in accordance with the invention. In the preparation of the polymers, the liquid monomer was subjected to gamma radiation from a Cobalt-60 source to a dosage of 4.0 megarads at a dosage rate of 0.25 megarad per hour. The polymer so produced was employed 2 percent concentration in from 3 percent to 18 percent aqueous solutions of HCl, a 15 percent aqueous solution of $H_2SO_4$, and a 30 percent aqueous solution of $H_3PO_4$. Each of the acids gelled at once upon admixture of the polymer in a highly desirable manner and remained in a gelled state as long afterwards as they were retained for observation. Mixtures of the above acids may also be gelled according to the practice of the invention.

Having described our invention, what we claim and desire to protect by Letters Patent is:

1. The method of gelling an inorganic ionic liquid, having an oxidizing potential less than that of concentrated nitric acid, which comprises:
   (1) preparing a cross-linked, water-insoluble, water-swellable polymer by polymerizing a polymerizable compound having the formula

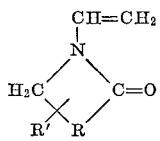

wherein R is selected from the class consisting of —$CH_2O$—, —$CH_2OCH_2$—, —$(CH_2)_2$—, and —$(CH_2)_3$— and wherein R' is an alkyl group containing from 1 to 2 carbon atoms and mixtures thereof, in the presence of a cross-linking agent selected from the class consisting of high energy particles produced by irradiation, polyvalent cross-linking reactants, and combinations of high energy particles produced by irradiation and polyvalent cross-linking reactants to effect that extent of cross-linking sufficient to provide a cross-linked polymer which is insoluble in water but is capable of imbibing at least about 17 grams by weight of a 20% by weight aqueous solution of HCl per gram of polymer in 48 hours;
   (2) drying and pulverizing the cross-linked polymer so produced; and
   (3) admixing the so-dried and pulverized polymer with the inorganic ionic liquid to be gelled in an amount of between about 0.5% and 25.0% of the polymer, based on the weight of the resulting so-treated inorganic ionic liquid; thereby to effect gelation of the inorganic ionic liquid.

2. The method according to claim 1 wherein said inorganic ionic liquid is selected from the class consisting of hydrochloric, hydrofluoric, sulfuric, phosphoric, nitrosylsulfuric acids, and mixtures thereof.

3. The method according to claim 1 wherein said inorganic ionic liquid is a Diver's solution comprising ammonium nitrate, ammonia, and water.

4. The method according to claim 1 wherein the cross-linking agent employed to prepare said polymer is selected from the class consisting of divinyl ether, divinyl benzene, N,N'-methylenebisacrylamide, divinyl ether of diethylene glycol, diacrylamide, and mixtures thereof.

5. The method according to claim 4 wherein a chemical catalyst is employed to prepare the polymer employed which chemical catalyst is selected from the class consisting of persulfates, peroxides, azo-type free radical-producing catalysts, and redox-type catalysts.

6. The method according to claim 1 wherein the polymerizable compound employed to prepare said polymer employed to effect gelatin is selected from the class consisting of N - vinylmorpholinone, N - vinyl - 2 - oxazolidinone, N-vinylpyrrolidone, N-vinylpiperidone, N-vinyl-5-methyl-2-oxazolidinone, N-vinyl-4-ethyl oxazolidinone, N-vinyl-3-methyl morpholinone, N - vinyl - 3 - ethyl pyrrolidone, N-vinyl-5-methyl piperidone, and mixtures thereof.

7. A gelled composition consisting essentially of an inorganic ionic liquid having an oxidizing potential of less than that of nitric acid, which has admixed therewith from about 0.5 to about 25.0% by weight of a dried and pulverized cross-linked water-insoluble water-swellable polymer which has been prepared by cross-linking a polymerizable compound having the formula:

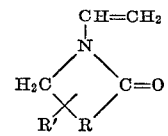

wherein R is selected from the class consisting of —$CH_2O$—, —$CH_2OCH_2$—, —$(CH_2)_2$—, and —$(CH_2)_3$ and wherein R' is an alkyl group containing from 1 to 2 carbon atoms and mixtures thereof, in the presence of a cross-linking agent selected from the class consisting of high energy particles produced by irradiation, polyvalent cross-linking reactants, and combinations of high energy particles produced by irradiation and polyvalent cross-linking reactants, said cross-linking agent having been sufficient to result in a water-insoluble polymer yet having a capacity of imbibing at least about 17 grams by weight of a 20% by weight aqueous solution of HCl per gram of polymer in 48 hours.

8. The composition of claim 7 wherein said inorganic ionic liquid employed is selected from the class consisting of hydrochloric, hydrofluoric, sulfuric, phosphoric, nitrosylsulfuric acids, and mixtures thereof.

9. The composition of claim 7 wherein said inorganic ionic liquid employed is a Diver's solution comprising ammonium nitrate, ammonia, and water.

10. The composition of claim 7 wherein the cross-linking agent used to prepare the polymer employed to effect gelation is selected from the class consisting of divinylether, divinyl benzene, N,N'-methylenebisacrylamide, divinylether of diethylene glycol, diacrylamide, and mixtures thereof.

11. The composition of claim 7 wherein a chemical catalyst is also employed to prepare the polymer employed to effect gelation, said catalyst being selected from the class consisting of persulfates, peroxides, azo-type free radical-producing catalysts, and redox-type catalysts.

12. The composition of claim 7 wherein the polymerizable compound employed to prepare the polymer employed to effect gelation is selected from the class consisting of N-vinyl morpholinone, N-vinyl-2-oxazolidonone, N-vinyl pyrrolidone, N-vinyl piperidone, N-vinyl-5-methyl-2-oxazolidinone, N-vinyl-4-ethyloxazolidinone, N-vinyl-3-methyl morpholinone, N-vinyl-3-ethyl pyrrolidone, N-vinyl-5-methyl piperidone, and the mixtures thereof.

References Cited

UNITED STATES PATENTS

| | | | |
|---|---|---|---|
| 2,077,469 | 4/1937 | Fazel | 71—59X |
| 2,658,045 | 11/1953 | Schildknecht | 260—29.6 |

RICHARD D. LOVERING, Primary Examiner

U.S. Cl. X.R.

71—59; 134—3; 149—46, 74; 252—136, 144, 145, 146, 160; 260—29.6